United States Patent
Matsuzawa

(10) Patent No.: US 8,363,350 B2
(45) Date of Patent: Jan. 29, 2013

(54) MAGNETIC DISK DRIVE HAVING MICROACTUATOR

(75) Inventor: Takuji Matsuzawa, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/241,086

(22) Filed: Sep. 22, 2011

(65) Prior Publication Data
US 2012/0243119 A1    Sep. 27, 2012

(30) Foreign Application Priority Data
Mar. 22, 2011    (JP) .................................. 2011-063337

(51) Int. Cl.
*G11B 5/596* (2006.01)
(52) U.S. Cl. ................................... 360/78.05; 360/78.09
(58) Field of Classification Search .......................... None
See application file for complete search history.

(56) References Cited

U.S. PATENT DOCUMENTS 7,126,785 B1* 10/2006 Li et al. ..................... 360/78.05
7,283,321 B1* 10/2007 Sun et al. .................... 360/78.05
2002/0101681 A1* 8/2002 He et al. ..................... 360/78.05

FOREIGN PATENT DOCUMENTS

| JP | 01-039675 | 2/1989 |
| JP | 2000-285621 | 10/2000 |
| JP | 2001-101812 | 4/2001 |
| WO | WO 01/75883 | 10/2001 |

* cited by examiner

*Primary Examiner* — Andrew L Sniezek
(74) *Attorney, Agent, or Firm* — Patterson & Sheridan, LLP

(57) ABSTRACT

According to one embodiment, a servo controller of a magnetic disk drive includes a microactuator (MA) estimator, VCM actuator (VCMA) controller, a filter and an adder. The MA estimator estimates a first displacement of an MA from a control input to be provided to the MA. The VCMA controller controls a VCMA based on a positioning error between a target track and a first position of the VCMA. The first position is estimated from a position of a head and the first displacement. The filter estimates a second position of the VCMA corresponding to a delay in a displacement of the MA caused by hysteresis of the MA, from a state of the VCMA in a seek operation, and estimates a second displacement that is the delayed displacement of the MA, from the second position. The adder adds the second displacement to an input to the MA controller.

10 Claims, 8 Drawing Sheets

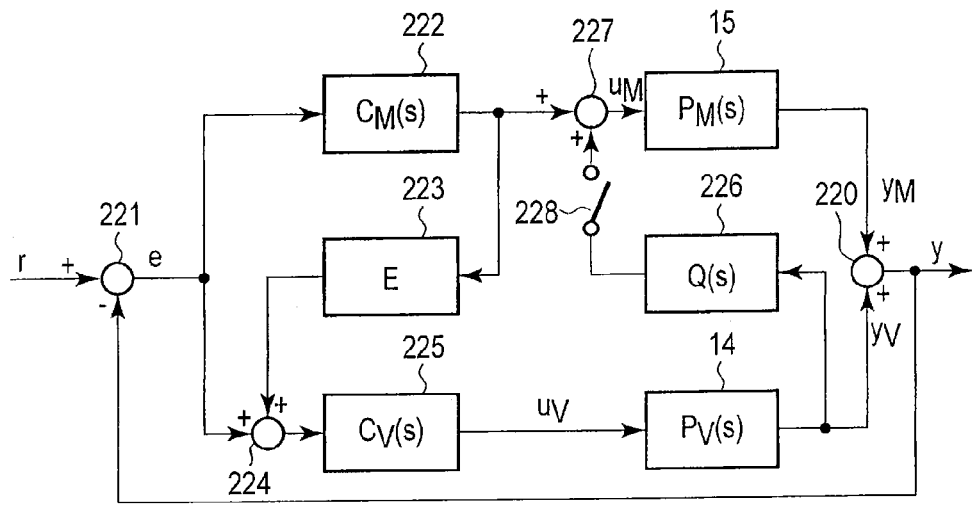
F I G. 2
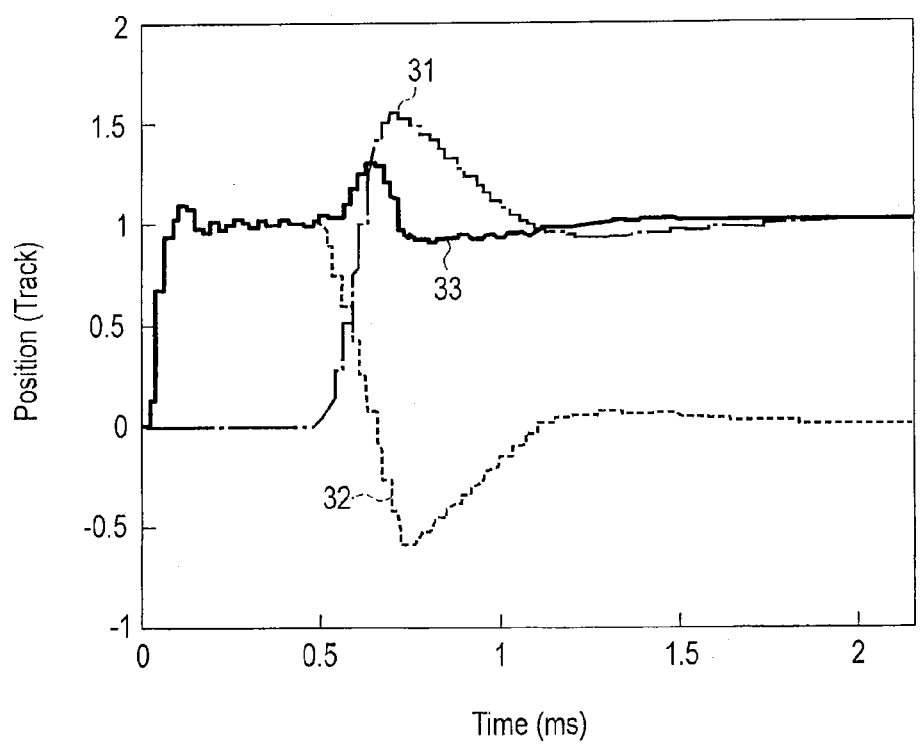
F I G. 3

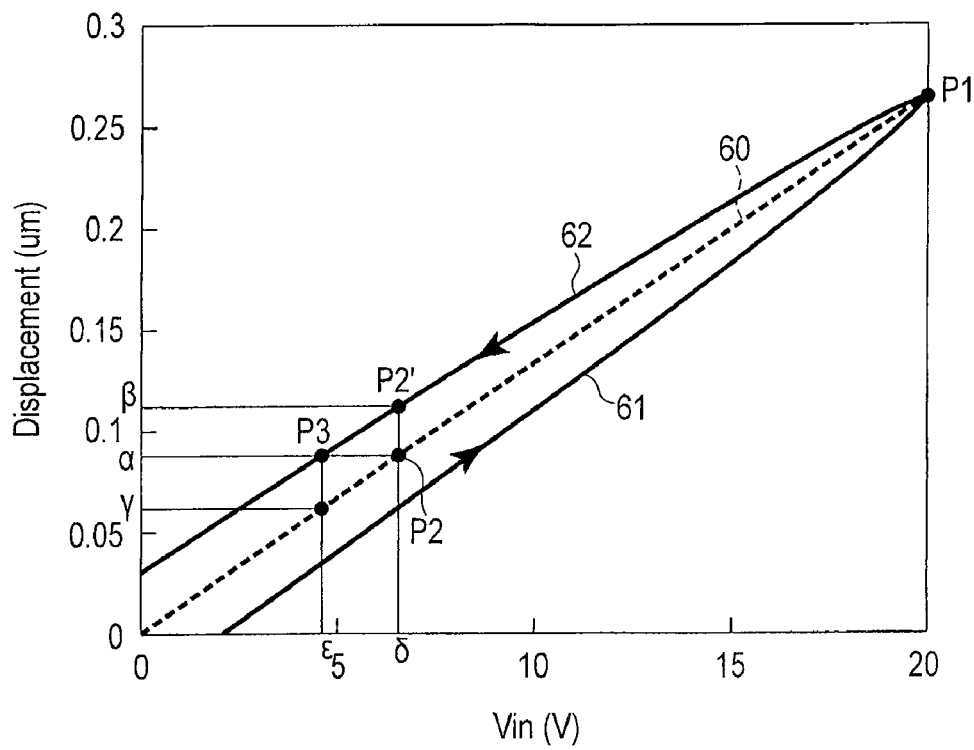
F I G. 6
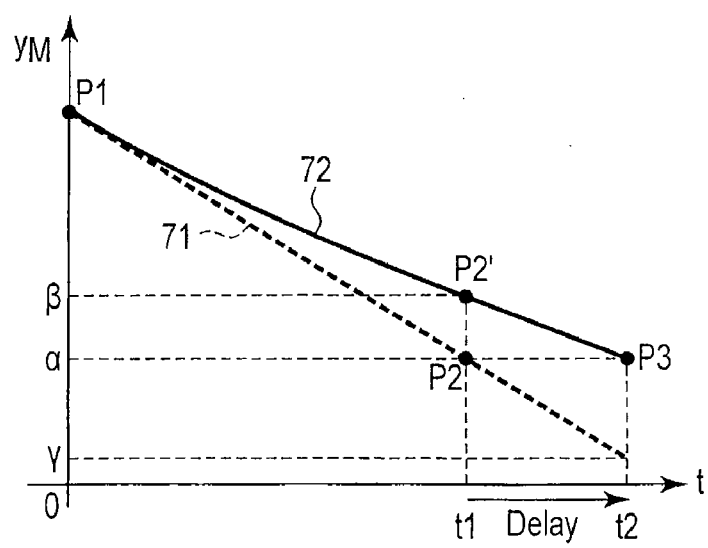
F I G. 7

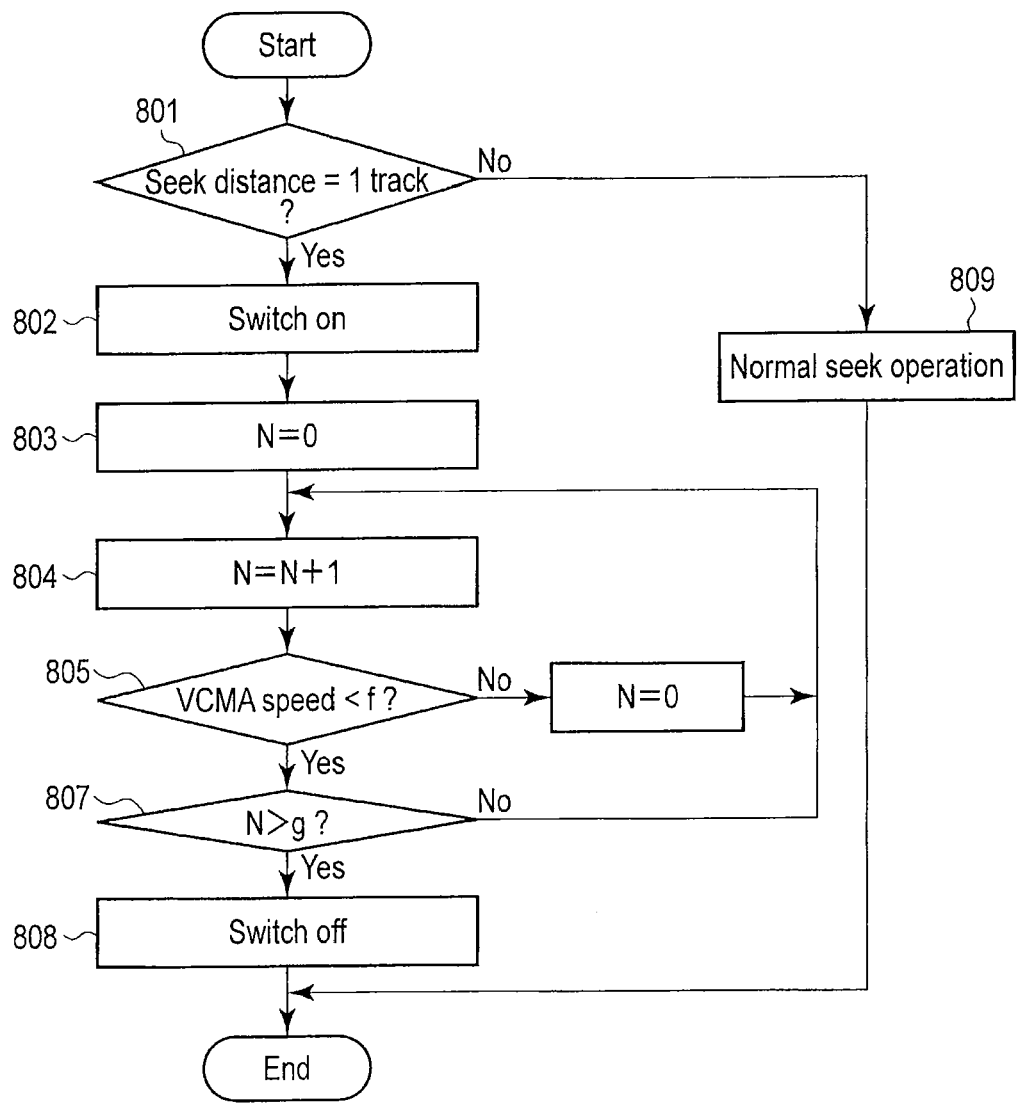
F I G. 10

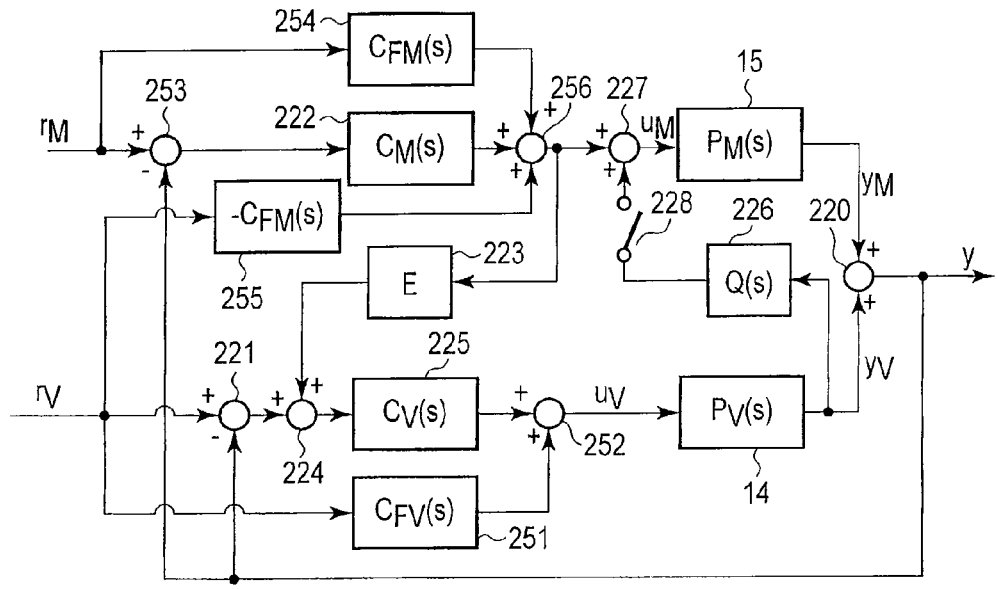
F I G. 13
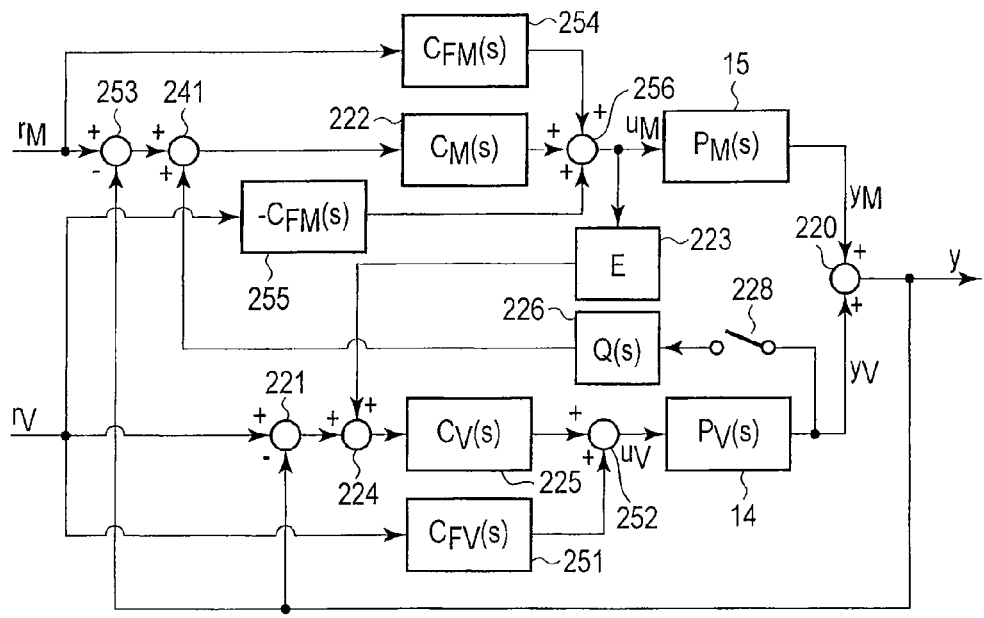
F I G. 14

MAGNETIC DISK DRIVE HAVING MICROACTUATOR

CROSS-REFERENCE TO RELATED APPLICATIONS

This application is based upon and claims the benefit of priority from prior Japanese Patent Application No. 2011-063337, filed Mar. 22, 2011, the entire contents of which are incorporated herein by reference.

FIELD

Embodiments described herein relate generally to a magnetic disk drive having a microactuator.

BACKGROUND

In recent years, with increased capacities of magnetic disk drives, much effort has been made to increase the track density thereof. The increased track density has required more and more accurate head positioning. The accurate head positioning in turn requires improvement of rapid responsiveness in head positioning control, that is, an increase in control bandwidth. Thus, recently, a magnetic disk drive has been proposed which comprises a microactuator excellent in following high frequencies, in addition to a voice coil motor (VCM) actuator, that is, a magnetic disk drive with a dual stage actuator (DSA) structure applied thereto.

The microactuator is driven by applying a voltage to an element (for example, a piezoelectric element) forming the microactuator. The microactuator is displaced differently depending on whether a voltage is applied to the microactuator in a direction in which the voltage increases or in a direction in which the voltage decreases. That is, the microactuator has a hysteresis property for the applied voltage.

The hysteresis property of the microactuator may affect a seek operation for moving a head to a target track using both the VCM actuator and microactuator.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary configuration of a servo controller applied in the first embodiment;

FIG. 3 is a diagram showing examples of respective positions of a VCM actuator, a microactuator, and a head in a servo controller in FIG. 2, with respect to time which positions are observed if a one-track seek operation is performed utilizing the microactuator without consideration for the hysteresis property of the microactuator;

FIG. 6 is a diagram showing an example of displacement of the microactuator with respect to a microactuator voltage observed if hysteresis is present, in comparison with displacement of the microactuator with respect to the microactuator voltage observed if no hysteresis is present;

FIG. 7 is a diagram showing examples of displacement of the microactuator with respect to time observed if hysteresis is present and if no hysteresis is present;

FIG. 10 is a flowchart showing an exemplary procedure for a seek operation applied in the first embodiment;

FIG. 11 is a diagram illustrating an example of characteristics of the one-track seek operation with the impact of hysteresis of the microactuator compensated for according to the first embodiment, in comparison with an example of characteristics of the one-track seek operation with the impact of the hysteresis not compensated for;

FIG. 13 is a block diagram showing an exemplary configuration of a servo controller applied in a third embodiment; and FIG. 14 is a block diagram showing an exemplary configuration of a servo controller applied in a fourth embodiment.

DETAILED DESCRIPTION

Various embodiments will be described hereinafter with reference to the accompanying drawings. In general, according to one embodiment, a magnetic disk drive comprises a voice coil motor (VCM) actuator, a microactuator, and a servo controller. The VCM actuator is configured to coarsely move a head. The microactuator is configured to slightly move the head. The servo controller is configured to control a predetermined seek operation of moving the head to a target track using both the VCM actuator and the microactuator. The servo controller comprises a microactuator controller, a microactuator estimator, a VCM actuator controller, a filter, and an adder. The microactuator controller is configured to control the microactuator based on a positioning error between the target track and a position of the head or a positioning error between a first target trajectory and the position of the head. The first target trajectory corresponds to the microactuator. The microactuator estimator is configured to estimate a first displacement of the microactuator using a linear model from a first control input to be provided to the microactuator. The VCM actuator controller is configured to control the VCM actuator based on a positioning error between the target track and a first position of the VCM actuator or a positioning error between a second target trajectory and the first position of the VCM actuator. The second target trajectory corresponds to the VCM actuator and the first position is estimated from the position of the head and the first displacement. The filter is configured to estimate a second position of the VCM actuator corresponding to a delay in the displacement of the microactuator caused by hysteresis of the microactuator, from a state of the VCM actuator in the predetermined seek operation, and to estimate a second displacement that is the delayed displacement of the microactuator, from the second position. The adder is configured to add the second displacement or a second control input corresponding to the second displacement to an input to the microactuator controller or an input to the microactuator.

First Embodiment

Figure 1:
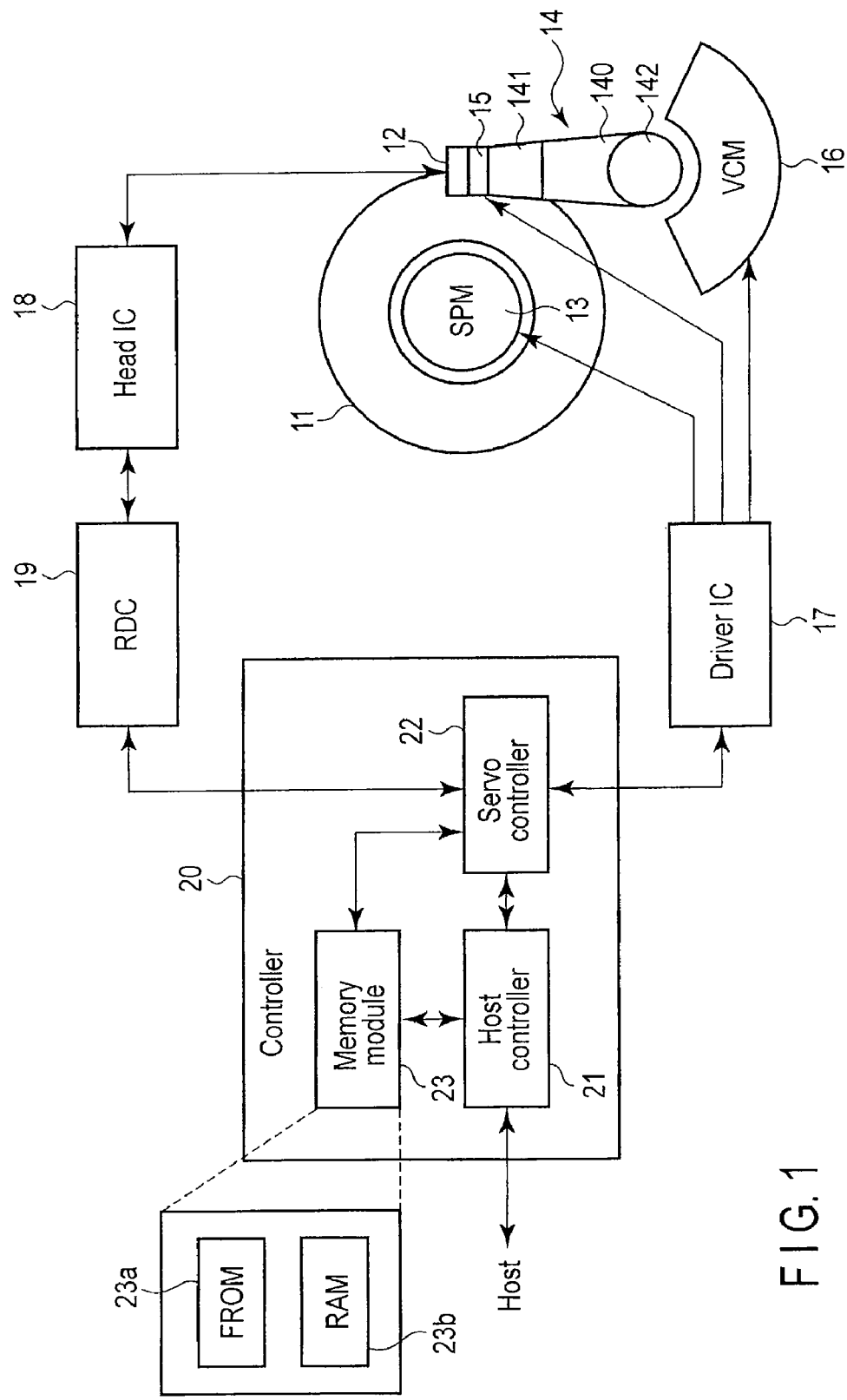
FIG. 1 is a block diagram showing an exemplary configuration of a magnetic disk drive according to a first embodiment.

FIG. 1 is a block diagram showing an exemplary configuration of a magnetic disk drive according to a first embodiment. The magnetic disk drive (HDD) shown in FIG. 1 comprises a disk (magnetic disk) 11, a head (magnetic head) 12, a spindle motor (SPM) 13, a VCM actuator (VCMA) 14, a microactuator (MA) 15, a voice coil motor (VCM) 16, a driver IC 17, a head IC 18, a read channel (RDC) 19, and a controller 20. The disk 11 is a magnetic recording medium. For example, one surface of the disk 11 forms a recording surface on which data is magnetically recorded. The disk 11 is rotated at high speed by the SPM 13. The SPM 13 is driven by, for example, a drive current supplied by the driver IC 17.

The head 12 is arranged in association with the recording surface of the disk 11. The head 12 comprises a read element and a write element neither of which is shown in the drawings. The head 12 is to write data to the disk 11 and to read data from the disk 11. In the configuration shown in FIG. 1, the HDD is assumed to comprise a single disk 11. However, the HDD may comprise a plurality of disks 11 stacked therein. Furthermore, in the configuration shown in FIG. 1, one surface of the disk 11 forms the recording surface. However, both surfaces of the disk 11 may form recording surfaces, with heads arranged in association with the respective recording surfaces.

The VCMA 14 comprises an arm 140. The head 12 is attached to a tip of a suspension 141 extended from the arm 140 of the VCMA 14 (more specifically, the head 12 is attached to a head slider provided at the tip of the suspension 141). Moreover, the MA 15 is attached to the suspension 141 (more specifically, to between the suspension 141 and the head slider). Thus, the HDD shown in FIG. 1 has a dual stage actuator structure (hereinafter referred to as a DSA structure) applied thereto and comprising the VCMA 14 and the MA 15.

MA 15 is driven in accordance with a control input $u_M$ provided via the driver IC 17 by a servo controller 22 described below (more specifically, in accordance with a drive voltage specified by a control input $u_M$). Thus, the MA 15 slightly moves the corresponding head 12. In the description below, in order to avoid complication, the control input $u_M$ is assumed to be a drive voltage (MA voltage) applied to the MA 15.

VCMA 14 is supported so as to be pivotally movable around a pivot 142. The VCMA 14 comprises the VCM 16. The VCM 16 is a drive source for the VCMA 14. The VCM 16 is driven in accordance with the control input $u_V$ provided via the driver IC 17 by the servo controller 22 (more specifically, in accordance with a drive current specified by the control input $u_V$) to pivotally move the VCMA 14 around the pivot 142. That is, the VCM 16 moves the arm 140 of the VCMA 14 radially relative to the disk 11. Thus, the head 12 is also moved radially relative to the disk 11. In the description below, the control input $u_V$ is assumed to be a drive current supplied to the VCM 16 (VCMA 14).

The driver IC 17 drives the SPM 13, the VCM 16 (VCMA 14), and the MA 15 under the control of the servo controller 22. The head IC 18 is also called a head amplifier and amplifies signals read by the head 12 (that is, read signals). The head IC 18 also converts write data output by the RDC 19 into a write current. The head IC 18 then outputs the write current to the head 12.

RDC 19 processes signals associated with read and write. That is, the RDC 19 converts a read signal amplified by the head IC 18 into digital data. The RDC 19 decodes the digital data into read data. The RDC 19 also extracts servo data (servo patterns) from the digital data. The RDC 19 also codes write data transferred by the controller 20. The RDC 19 transfers the coded write data to the head IC 18.

The controller 20 comprises a host controller 21, a servo controller 22, and a memory module 23. The host controller 21 transmits and receives signals to and from a host via an external interface (storage interface). Specifically, the host controller 21 receives commands (a write command, a read command, and the like) transmitted by the host via the external interface. The host controller 21 controls the data transfer between the host and the host controller 21.

The servo controller 22 controls the VCM 16 via the driver IC 17 for coarse adjustment when the head 12 is positioned at a target position on the disk 11. Here, controlling the VCM 16 is equivalent to controlling the VCMA 14 comprising the VCM 16. The servo controller 22 further controls the MA 15 via the driver IC 17 in order to fine-tune the position of the head 12. Furthermore, the servo controller 22 controls a predetermined seek operation for moving the head 12 to a target track using both the VCMA 14 and the MA 15. The predetermined seek operation will be described below.

In the first embodiment, the host controller 21 and the servo controller 22 comprises respective CPUs (not shown in the drawings). The CPUs execute respective control programs for the host controller 21 and the servo controller 22 stored in the FROM 23a described below, to implement the functions of the host controller 21 and the servo controller 22. A single CPU may execute the respective control programs for the host controller 21 and the servo controller 22 in a time division manner.

The memory module 23 comprises a flash ROM (FROM) 23a and RAM 23b. The FROM 23a is a rewritable nonvolatile memory. The control programs (firmware) are prestored in the FROM 23a; the control programs serve to implement the functions of the controller 20 including the host controller 21 and the servo controller 22. At least a part of the storage area in the RAM 23b is used as a work area for the host controller 21 and the servo controller 22. In FIG. 1, for simplification, a disk controller generally provided in the controller 20 is omitted. The disk controller controls data writes to the disk 11 and data reads from the disk 11.

FIG. 2 is a block diagram showing an exemplary configuration of the servo controller 22 applied in the first embodiment. The servo controller 22 controls the VCM 16 (indirectly controls the VCMA 14 driven by the VCM 16) and the MA 15 based on servo data recorded in the disk 11, in order to position the head 12 at the target position of the target track. That is, the servo controller 22 controls the VCMA 14 by feedback control to coarsely adjust the position of the head 12. The servo controller 22 also controls the MA 15 by feedback control to fine-tune the position of the head 12. Thus, the MA 15 and the VCMA 14 are control targets (what is called plants) for the feedback control system. Hence, in FIG. 2, the VCMA 14 is denoted as $P_V(s)$, and the MA 15 is denoted as $P_M(s)$.

The servo controller 22 comprises a subtractor 221, an MA controller ($C_M(s)$) 222, an MA model (E) 223, an adder 224, a VCMA controller ($C_V(s)$) 225, a filter (Q(s)) 226, an adder 227, and a switch 228. In FIG. 2, a symbol y at an addition point 220 denotes the position of the head 12 (head position) over the disk 11. Here, the position of the VCMA ($P_V(s)$) 14 is denoted by $y_V$, and displacement of the MA ($P_M(s)$) 15 is denoted by $y_M$. In this case, the sum ($y_V + y_M$) of the position $y_V$ and the displacement $y_M$ is observed as the head position y at the addition point 220. The head position y is detected based on servo data extracted by the RDC 19 at a predetermined sampling period.

The subtractor 221 determines the difference between the head position y and a target position r to be a positioning error e (=r−y). The MA controller ($C_M(s)$) 222 generates a control input to be provided to the MA ($P_M(s)$) 15 based on the positioning error e. The MA model (E) 223 is a linear model and is used to estimate displacement of the MA 15 (more specifically, the displacement relative to the VCMA 14) based on the control input generated by the MA controller ($C_M(s)$) 222. That is, the MA model (E) 223 is used as an MA estimator that estimates the displacement of the MA 15 based on a linear model.

The adder 224 adds the displacement of the MA 15 estimated by the MA model 223 to the positioning error e (=r−y=r−$y_V$−$y_M$) calculated by the subtractor 221. If the estimated displacement of the MA 15 is equal to the actual displacement $y_M$, the addition performed by the adder 224 is equivalent to the calculation of the difference (r−$y_V$) between the target value r and the position $y_V$ of the VCMA 14. That is, the position $y_V$ of the VCMA 14 is estimated from the position y of the head 12 and the estimated displacement of the MA 15. The addition result from the adder 224 is provided to an input of the VCMA controller ($C_V(s)$) 225. This prevents the VCMA 14 and the MA 15 from being interfered with. That is, the servo controller 22 forms a decoupling structure for the VCMA ($P_V(s)$) 14 and the MA ($P_M(s)$) 15. The VCMA controller ($C_V(s)$) 225 generates a control input $u_V$ to be provided to the VCMA 14 based on the addition result from the adder 224.

The displacement of the MA 15 can also be detected by, for example, a relative position sensor. However, the relative position sensor is expensive. Thus, in general, the displacement of the MA 15 is estimated using the MA model 223 (E) 223 as described above. Furthermore, a linear model is generally used as the MA model 223 so that the displacement of the MA 15 has a linear relationship with an increase and a decrease in a voltage Vin applied to the MA 15 (the voltage Vin is hereinafter referred to as an MA voltage).

As is well known, the MA 15 has a higher response rate than the VCMA 14. Thus, seek time can be reduced by using the MA 15 to move the head 12 to the target track. However, the distance the head 12 can be moved radially relative to the disk 11 using the MA 15, what is called a seek distance, is limited to the range within which the MA 15 can be driven. The range within which the MA 15 can be driven is very narrow unlike in the case of the VCMA 14.

Thus, in the first embodiment, the MA 15 is utilized for a seek operation (that is, a one-track seek operation) of moving the head 12 by a distance corresponding to one track (more specifically, one track width) radially relative to the disk 11. If a seek operation is performed using the MA 15 (MA 15 and VCMA 14), the VCMA 14, having a lower response rate than the MA 15, reaches the target track later than the MA 15.

FIG. 3 shows the respective positions of the VCMA 14, the MA 15, and the head 12 with respect to time (more specifically, elapsed time from the beginning of the seek operation) if a seek operation of moving the MA 15 toward the target track by a distance equal to one track before the VCMA 14 is moved (one-track seek operation) is performed without consideration for the hysteresis property of the MA 15. Here, it is assumed that with the head 12 positioned at a track T, the head 12 is moved to a track T+1, the target track.

In FIG. 3, curves 31 and 32 indicate the position of the VCMA 14 and the position of the MA 15, respectively, with respect to time. A curve 33 indicates the position of the head 12 with respect to time. In FIG. 3, the respective positions of the VCMA 14, the MA 15, and the head 12 are indicated by relative positions for which each of the positions of the VCMA 14, the MA 15, and the head 12 observed at the beginning of the one-track seek operation is set to be a reference (0). In FIG. 3, the positions are indicated in units of tracks. For example, a position of 1 and a position of 0.5 indicate positions displaced from the reference position of 0 by one track and half a track, respectively. Thus, in FIG. 3, for example, the reference position of 0 corresponds to the position of track T at which the head 12 is positioned before the beginning of the one-track seek operation. The position of 1 corresponds to the position of track T+1.

As is apparent from FIG. 3, compared to the position of the VCMA 14, the position of the MA 15 indicated by the curve 32 approaches 1 in a very short time as a result of the rapid responsiveness of the MA 15. That is, the MA 15 approaches the target track at a high speed. To allow the MA 15 to approach the target track at a high speed, a large MA voltage is applied to the MA 15 even at the beginning of a seek operation. The MA voltage decreases consistently with the distance between the MA 15 and the target track.

Figure 4:
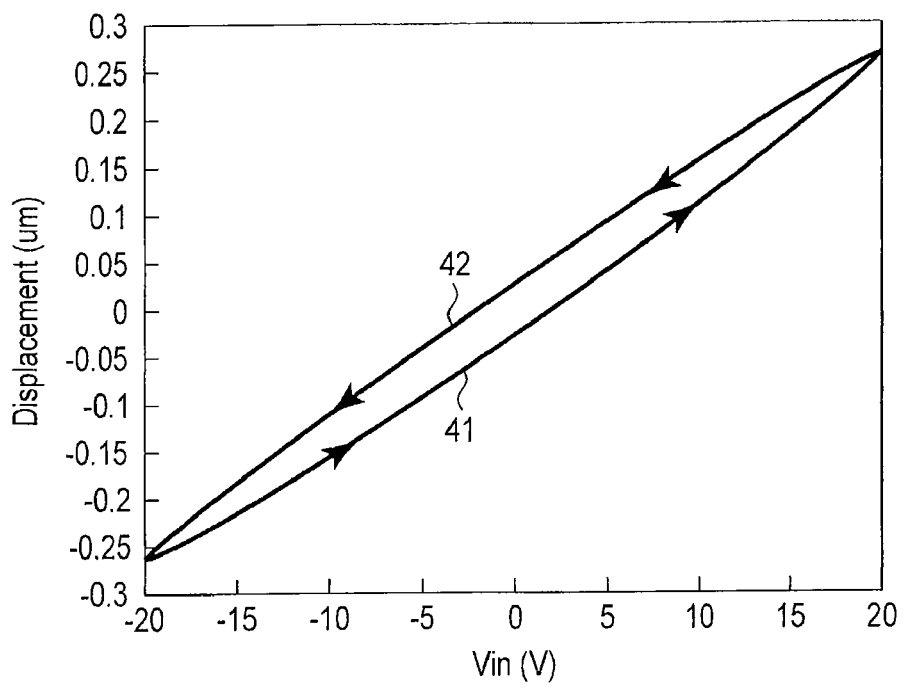
FIG. 4 is a diagram showing an example of the hysteresis property of the microactuator.

In general, the MA 15 has a hysteresis property for the MA voltage. FIG. 4 illustrates the hysteresis property of the MA 15. In FIG. 4, a curve 41 indicates the displacement of the MA 15 with respect to the MA voltage Vin observed if the MA voltage Vin increases gradually from −20 to +20 V. In FIG. 4, in contrast to the curve 41, a curve 42 indicates the displacement of the MA 15 with respect to the MA voltage Vin observed if the MA voltage Vin decreases gradually from +20 to −20 V. As is apparent from the curves 41 and 42, the MA 15 has the hysteresis property for the MA voltage. The magnitude of hysteresis of the MA 15 increases consistently with the amount of an increase or a decrease in voltage. Thus, when the MA voltage decreases because the MA 15 approaches the target track after a high MA voltage is applied to the MA 15 at the beginning of a seek operation, the MA 15 is significantly affected by the hysteresis.

Figure 5:
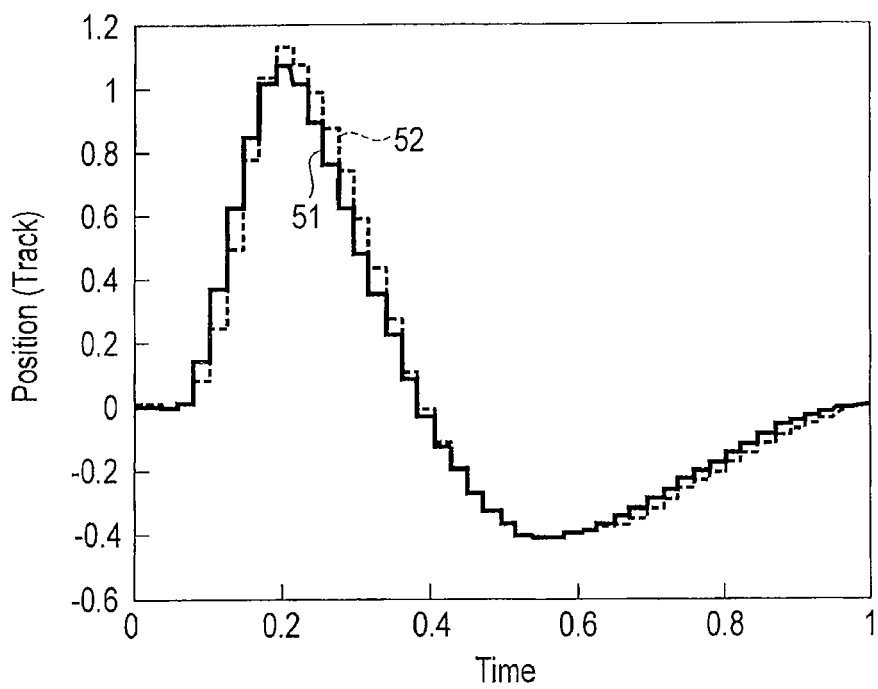
FIG. 5 is a diagram showing examples of displacement of the microactuator with respect to time during the one-track seek operation, and specifically showing estimated displacement and actual displacement.

However, the MA model 223 is a linear model. Thus, if the MA 15 is subjected to hysteresis, an error occurs between the actual MA displacement of the MA 15 and the displacement estimated by the MA model 223. FIG. 5 shows the displacement (position) of the MA 15 with respect to time during the one-track seek operation; FIG. 5 shows each of the estimated displacement and the actual displacement. In FIG. 5, a curve 51 indicates the relationship between the time and the estimated displacement of the MA 15, that is, the relationship between the time and the displacement of the MA 15 observed if the MA model 223 is applied on the assumption that the MA 15 has no hysteresis property. A case where the MA 15 is assumed to have no hysteresis property is hereinafter simply referred to as a case where no hysteresis is present. A curve 52 indicates the relationship between the time and the actual displacement of the MA 15, that is, the relationship between the time and the displacement of the MA 15 observed if the MA 15 has the hysteresis property. A case where the MA 15 has the hysteresis property is hereinafter simply referred to as a case where hysteresis is present.

As is apparent from FIG. 5, the hysteresis causes a difference (positioning error) between the estimated displacement and actual displacement of the MA 15. That is, the hysteresis results in the positioning error during a shift to a steady state in which the head 12 is positioned at the target track for the following reason: a seek operation using the MA 15 (one-track seek operation) involves a high voltage applied to the MA 15 at the beginning of the seek operation. Thus, as shown by the curve 33 in FIG. 3, in the one-track seek operation, an off track state occurs in which the head 12 is misaligned with the target track. Hence, the head 12 is difficult to position at the target track at high speed.

Thus, a configuration for reducing the positioning error resulting from the hysteresis is applied in the first embodiment when the one-track seek operation is performed utilizing the MA 15 (that is, a short-distance seek operation is performed). The configuration will be described below. In the one-track seek operation, the first embodiment utilizes a monotonic variation (here an increase) in the position (displacement) of the VCMA 15 during a monotonic decrease in the MA voltage (that is, the displacement of the MA 15) after the MA 15 reaches the target track before the VCMA 14. Specifically, the impact of the hysteresis is considered to be a delay in the MA voltage from the state in which the MA 15 is assumed to be driven in accordance with a linear model. The delay in the MA voltage appears as delay in the displacement of the MA 15 because of the relationship between the MA voltage and the displacement of the MA 15. Thus, the impact of the hysteresis can be considered to be a delay in the displacement of the MA 15 if the MA voltage is converted into the displacement of the MA 15.

The significance of considering the impact of the hysteresis to be a delay in the MA voltage (displacement of the MA 15) will be described with reference to FIG. 6 and FIG. 7. FIG. 6 shows the displacement of the MA 15 with respect to the MA voltage Vin observed if hysteresis is present, in comparison with the displacement of the MA 15 with respect to the MA voltage Vin observed if no hysteresis is present. In FIG. 6, curves 61 and 62 correspond to the curves 41 and 42 in FIG. 4. However, in FIG. 6, the range within which the MA voltage Vin is negative is omitted. A straight line 60 indicates the displacement of the MA 15 with respect to the MA voltage Vin observed if no hysteresis is present.

FIG. 7 shows the displacement of the MA 15 (the relative position of the MA 15) with respect to time observed if no hysteresis is present (former case) and if hysteresis is present (latter case). In FIG. 7, a straight line 71 indicates the displacement of the MA 15 with respect to time in the former case (that is, the straight line 71 indicates the estimated displacement of the MA 15). A straight line 72 indicates the displacement of the MA 15 with respect to time in the latter case (that is, the straight line 71 indicates the actual displacement of the MA 15).

Here, it is assumed that the MA 15 reaches the target track earlier and that at this time, the VCMA 14 is moving toward the target track. At a point P1 on the straight line 60, the curve 62, the straight line 71, and the curve 72, the displacement of the MA 15 becomes 1, and the MA 15 reaches the target track. The corresponding time t is 0. The MA voltage at time t=0 is high as described above. The MA voltage subsequently decreases gradually as the time t elapses. This is because the VCMA 14 approaches the target track 14 (see FIG. 3). With a gradual decrease in the MA voltage, the displacement of the MA 15 decreases monotonically from the point P1 (time t=0) as the time t elapses.

It is assumed that subsequently at time t1 when the MA voltage Vin is $\delta$, the displacement of the MA 15 observed if no hysteresis is present (that is, the estimated displacement at a point P2 on the straight line 60 in FIG. 6 and on the straight line 71 in FIG. 7) corresponds to $\alpha$. However, with hysteresis present, even if the MA voltage corresponds to $\delta$, the displacement of the MA 15 (that is, the actual displacement) appears as a displacement $\beta$ at a point P2' on the curve 62 in FIG. 6 and the curve 72 in FIG. 7. Thus, the displacement of the MA 15 differs by $\beta-\alpha$ between the presence of hysteresis and the absence of hysteresis. The value $\beta-\alpha$ corresponds to a positioning error resulting from the hysteresis.

When the one-track seek operation continues after time t1 and the VCMA 14 further approaches the target track, the MA voltage further decreases. As described above, in the one-track seek operation, while the MA voltage (the displacement of the MA 15) is decreasing monotonically after the MA 15 reaches the target track, the position of the MA 14 increases monotonically. Thus, the actual displacement of the MA 15 after time t1 corresponds to $\alpha$. Here, it is assumed that at time t2 (t2>t1) when the MA voltage Vin decreases to $\epsilon$ ($\epsilon<\delta$), the actual displacement of the MA 15 at a point P3 on the curve 62 in FIG. 6 and the curve 72 in FIG. 7 corresponds to $\alpha$. That is, the actual displacement $\alpha$ of the MA 15 required at time t1 and the MA voltage $\epsilon$ (Vin=$\epsilon$) required for the displacement $\alpha$ are obtained at time t2, which is later than time t1 by t2−t1.

As described above, with hysteresis present, the displacement $\alpha$ of the MA 15 required at time t1 is obtained when the time period t2−t1 elapses after time t1. Hence, the impact of the hysteresis can be considered to be a delay in the displacement of the MA 15 as shown in FIG. 7. Furthermore, the MA voltage $\epsilon$ required for the displacement $\alpha$ is obtained at time t2, the time t2−t1 after time t1. Hence, the impact of the hysteresis can be considered to be a delay in the MA voltage Vin as well. That is, the presence of the hysteresis can be considered to delay the displacement of the MA 15 and the MA voltage.

To obtain the actual displacement a of the MA 15 at time t1, the MA 15 needs to be provided with $\epsilon$ as the MA voltage (control input $u_M$) as is apparent from FIG. 6. The MA voltage $\epsilon$ corresponds to the displacement $\gamma$ of the MA 15 observed if no hysteresis is present. However, with no hysteresis present, at time t1, the MA 15 is provided with the MA voltage (control input $u_m$) $\delta$. As a result, the actual displacement of the MA 15 corresponds to $\beta$.

To allow $\delta$ provided to the MA at time t1 to be corrected to $\epsilon$, the MA voltage $\epsilon-\delta$ may be obtained. Furthermore, to allow the displacement of the MA 15 required at time t1 to be corrected from $\alpha$ to $\gamma$, the displacement $\gamma-\alpha$ may be obtained. With no hysteresis present, the MA voltage $\epsilon$ is provided to the MA 15 at time t2 as described above, in order to obtain the displacement $\gamma$. At this time, the actual displacement corresponds to $\alpha$. Hence, the MA voltage $\epsilon-\delta$ and the displacement $\gamma-\alpha$ of the MA 15 can be considered to be the delay from time t1 resulting from the hysteresis and corresponding to the time t2−t1.

Thus, in the first embodiment, a future MA voltage (displacement of the MA 15) corresponding to the delay caused by the hysteresis, that is, a future relative positioning error, is estimated in order to reduce the impact of the hysteresis. In the above-described example, the future MA voltage corresponds to $\epsilon$, and the future displacement of the MA 15 corresponds to $\gamma$. On the other hand, the MA voltage corresponding to the delay caused by the hysteresis corresponds to $\epsilon-\delta$. The displacement of the MA 15 corresponding to the delay caused by the hysteresis corresponds to $\gamma-\alpha$. Furthermore, in the first embodiment, the control input corresponding to the delay caused by the hysteresis is added to the control input generated by the MA controller (CM(s)) 222 so as to apply the control input $u_M$ (MA voltage) corresponding to the estimated future MA voltage (the estimated future displacement of the MA 15) to the MA 15. The added control input is provided to the MA 15 as the control input $u_M$ (MA voltage).

Now, the estimation of the future MA voltage (the future displacement of the MA 15) corresponding to the delay caused by the hysteresis will be described with reference again to FIG. 2 and FIG. 7. The MA voltage, that is, the control input $u_M$, depends on the positioning error e at the track to which the head 12 is to move (that is, the target track) as well as the position $y_V$ of the VCMA 14. The head position y obtained by adding the position $y_V$ of the VCMA 14 and the displacement $y_M$ of the MA 15 together needs to be constant in order to keep the head 12 at the target position in the target track. This indicates that estimation of the future position of the VCMA 14 enables the future displacement of the MA 15 (or the future MA voltage) to be estimated.

Thus, in the first embodiment, the future position of the VCMA 14 is estimated in order to allow estimation of the future displacement of the MA 15 (or the future MA voltage) corresponding to the delay caused by the hysteresis. Hence, as shown in FIG. 2, a filter (Q(s)) 226, an adder 227, and a switch 228 are additionally provided in the controller 20. The filter 226 passes an output from the VCMA ($P_V(s)$) 14 through the filter 226 to estimate the future position of the VCMA 14. The filter 226 also estimates a control input corresponding to the future displacement of the MA 15 (or the future MA voltage) from the estimated future position of the VCMA 14.

The adder 227 is provided in a control loop for the MA 15. The adder 227 adds an output from the filter 226 (that is, a control input corresponding to the future displacement of the MA 15 or the future MA voltage) to a control input generated by the MA controller ($C_M(s)$) 222. The switch 228 is set to an on state (first state) at the beginning of a predetermined seek operation. The switch 228 permits effective outputs to be transmitted from the filter 226 to the adder 227 while the switch 228 is in the on state. In the first embodiment, the predetermined seek operation is the one-track seek operation.

For example, the current position $y_V$ of the VCMA 14 and a VCM speed are used to estimate the future position of the VCMA 14. The VCM speed indicates the amount of variation in the position of the VCMA 14. The filter (Q(s)) 226 multiplies the VCM speed by a predetermined coefficient p and adds the current position $y_V$ of the VCMA 14 to the multiplication result to estimate the future position of the VCMA 14. The filter (Q(s)) 226 thus calculates a control input corresponding to the displacement of the MA 15 or the MA voltage corresponding to the delay caused by the hysteresis. Coefficient p is an index indicating the degree to which the future position is estimated. The VCM speed (that is, the speed of the VCMA 14) can be obtained by differentiating the position of the VCMA 14. Thus, the filter (Q(s)) 226 provided with a differentiator determines the VCM speed based on the position of the VCMA 14.

Coefficient p depends on a delay in the displacement of the MA 15 caused by the hysteresis as well as the speed of the VCMA 14, and is not constant. Thus, in the first embodiment, coefficient p is preset, which is a value corresponding to an average delay time. The average delay time is calculated by, for example, dividing the delay in the displacement of the MA 15 caused by the hysteresis by the VCM speed. Alternatively, a table may be stored in the FROM 23a; the results of measurement of the hysteresis property of the MA 15 and of the speed of the VCMA 14 during a seek operation (one-track seek operation) are set in the table. Alternatively, the table may be set in the firmware stored in the FROM 23a.

Figure 8:
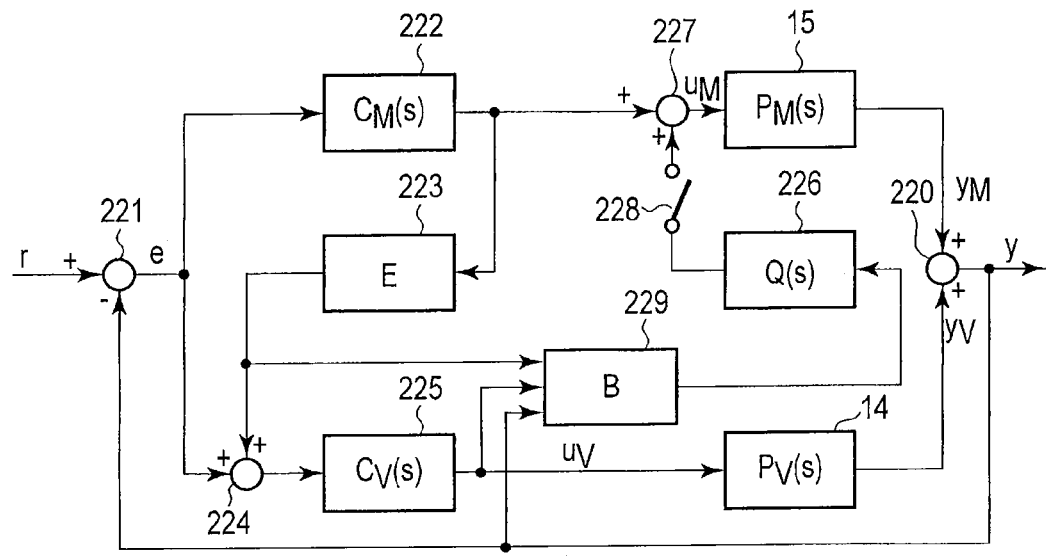
FIG. 8 is a block diagram showing an exemplary configuration of a servo controller applied in a first modification of the first embodiment.

Now, a first modification of the first embodiment will be described. FIG. 8 is a block diagram showing a configuration of the servo controller 22 applied in the first modification of the first embodiment. Elements in FIG. 8 which are equivalent to those in FIG. 2 are denoted by the same reference numbers. The servo controller 22 shown in FIG. 8 comprises a state observer (B) 229. The state observer (B) 229 comprises a VCMA model. The state observer (B) 229 estimates the position, speed, and acceleration of the VCMA 14 based on the VCMA model as well as the output $u_V$ from the VCMA controller 225 (that is, an input to the VCMA 14), the displacement of the MA 15 estimated by the MA model (E) 223, and the position of the head 12 (head position). The head position y, that is, the head position y detected by the RDC 19, is used as the position of the head 12.

In the first modification, the speed of the VCMA 14 estimated by the state observer 229 is used as the speed of the VCMA 14 used to estimate the future position of the VCMA 14 described above. That is, the speed of the VCMA 14 estimated by the state observer 229 is input to the filter 226. However, the speed of the VCMA 14 can be obtained by differentiating the position of the VCMA 14 as described above. Thus, the filter 226 may comprise a differentiator configured to differentiate the position of the VCMA 14 estimated by the state observer 229. In this case, the speed of the VCMA 14 estimated by the state observer 229 is not necessarily input to the filter 226.

Figure 9:
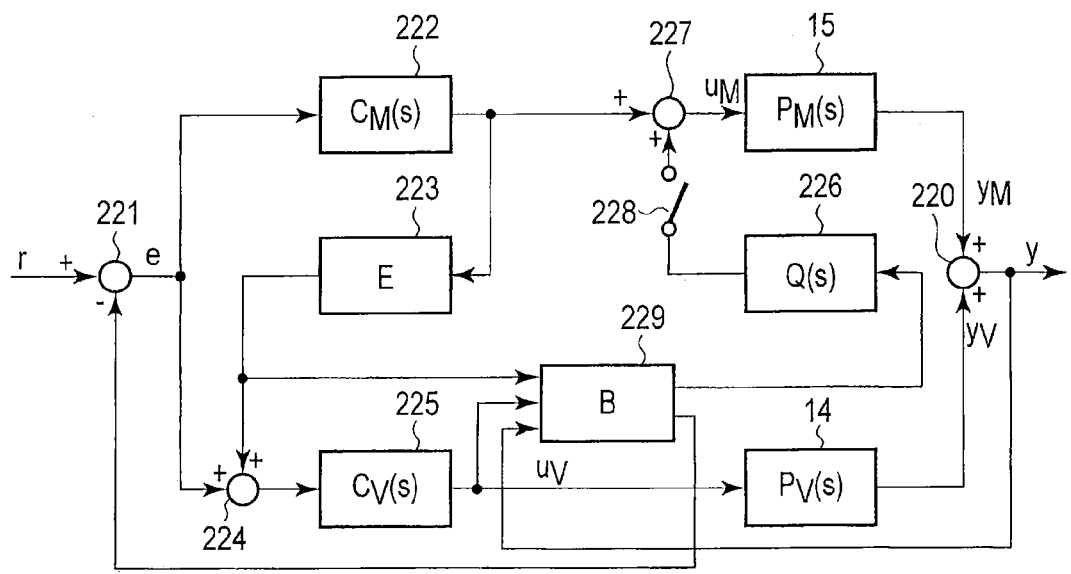
FIG. 9 is a block diagram showing an exemplary configuration of a servo controller applied in a second modification of the first embodiment.

Now, a second modification of the first embodiment will be described. FIG. 9 is a block diagram showing a configuration of the servo controller 22 applied in the second modification of the first embodiment. Elements in FIG. 9 which are equivalent to those in FIG. 2 and FIG. 8 are denoted by the same reference numbers. The servo controller 22 shown in FIG. 9 is characterized in that as the head position used by the subtractor 221 to calculate the positioning error e, the head position estimated by the state observer (B) 229 is used instead of the head position y detected by the RDC 19.

In the second modification, the state observer 229 estimates the position, speed, and acceleration of the VCMA 14 (that is, the estimated state of the VCMA 14) based on the VCMA model as well as the output from the VCMA controller 225, the displacement of the MA 15 estimated by the MA model (E) 223, and the head position y. The state observer 229 further adds the estimated position of the VCMA 14 and the estimated displacement of the MA 15 together to estimate the position of the head 12.

In the second modification, the estimated state of the VCMA 14 is input to the filter (Q(s)) 226; the estimated state includes at least one of the position and speed of the VCMA 14 estimated by the state observer 229. The head position estimated by the state observer 229 is input to the subtractor 221 instead of the head position y detected by the RDC 19. As described above, the speed of the VCMA 14 can be obtained by differentiating the position of the VCMA 14. Thus, the filter 226 may comprises a differentiator configured to differentiate the position of the VCMA 14 estimated by the state observer 229. In this case, the estimated state of the VCMA 14 input to the filter 226 need not include the estimated speed of the VCMA 14.

Furthermore, the future position of the VCMA 14 can be estimated from the speed and acceleration of the VCMA 14. Thus, the filter 226 may estimate the future position of the VCMA 14 by taking the sum of the speed of the VCMA 14 estimated by the state observer 229 and, for example, multiplied by coefficient q by a multiplier and the acceleration of the VCMA 14 estimated by the state observer 229 and, for example, multiplied by coefficient m by the multiplier. Like the above-described coefficient p, coefficient q is an index indicating the degree to which the future position is estimated. Coefficient q is, for example, the above-described average delay time. Coefficient m is an index indicating the contribution of the acceleration observed up to a estimated future time.

Now, a procedure for a seek operation under the control of the servo controller 22 which procedure is applied in the first embodiment will be described with reference to a flowchart in FIG. 10. The procedure is also applied in the first and second modifications of the first embodiment. It is assumed that the head 12 is now positioned at track T (what is called an on track state). In this state, it is assumed that, for example, the host controller 21 issues a seek command to the servo controller 22. Then, the servo controller 22 starts a seek operation for moving the head 12 to the target track specified in the seek command.

First, the servo controller 22 determines whether a seek distance required to move the head 12 from track T at which the heat 12 is now positioned to the target track is equal to one track (one track width) (block 801). Here, it is assumed that the target track is track T+1, located adjacent to track T, and that the seek distance is thus equal to one track. If the seek distance is equal to one track as described above (Yes in block 801), that is, if the operation is the one-track seek operation, the servo controller 22 functions as a switching controller to turn on the switch 228 (block 802).

Then, in the servo controller 22, a control input corresponding to the displacement of the MA 15 or the MA voltage corresponding to the delay caused by the hysteresis estimated by the filer (Q(s)) 226 is input to the adder 227 via the switch 228. A control input generated by the MA controller ($C_M(s)$) 222 is also input to the adder 227. The adder 227 adds the control input corresponding to the displacement of the MA 15 or the MA voltage estimated by the filter (Q(s)) 226 and corresponding to the delay caused by the hysteresis, to the control input generated by the MA controller ($C_M(s)$) 222. The addition result from the adder 227 is provided to the MA 15 as the control input $u_r$. This enables a reduction in a possible error between the actual displacement of the MA 15 and the displacement of the MA 15 estimated by the MA model 223. That is, the impact of hysteresis of the MA 15 enables a reduction in a possible error in positioning of the head 12 at the target track.

When the switch 228 is turned on (block 802), the servo controller 22 functions as a detector to set a count N to an initial value of 0 (block 803). Then, the servo controller 22 increments the count N by one (block 804). The count N is used to indicate the number of samples for which the speed of the VCMA 14 (VCMA speed) is continuously lower than threshold (that is, a predetermined speed) f. Then, the servo controller 22 (detector) determines whether the speed of the VCMA 14 is lower than threshold f (block 805). If the speed of the VCMA 14 is not lower than threshold f (No in block 805), the servo controller 22 resets the count N to 0 (block 806). The servo controller 22 then returns to block 804.

In contrast, if the speed of the VCMA 14 is lower than threshold f (Yes in block 805), the servo controller 22 determines whether the count N is greater than threshold g (block 807). If the count N is not greater than threshold g (No in block 807), the servo controller 22 determines that the number of samples for which the speed of the VCMA 14 is continuously lower than threshold f does not exceed g. In this case, the servo controller 22 returns to block 804.

In contrast, if the count N is greater than threshold g (Yes in block 807), the servo controller 22 (detection means) determines that the number of samples for which the speed of the VCMA 14 is continuously lower than threshold f exceeds g. That is, servo controller 22 (detection means) detects a particular state in which the speed of the VCMA 14 is lower than threshold f for g consecutive samples. In this case, the servo controller 22 determines that the VCMA 14, which moves later than the MA 15, has stably reached the target track. Then, the servo controller 22 functions as a switching controller to turn off the switch 228 (block 808). This restrains the filter 226 from transmitting an effective output to the adder 227 and the seek operation (one-track seek operation) ends.

On the other hand, if the seek distance is not equal to one track (No in block 801), that is, if the operation is not the one-track seek operation, the servo controller 22 controls a normal seek operation (block 809). In the normal seek operation, the switch 228 is in an off state. In this case, the servo controller 22 functions as a decoupling structure for the VCMA 14 and the MA 15 as in the case of the conventional art.

Figure 11:
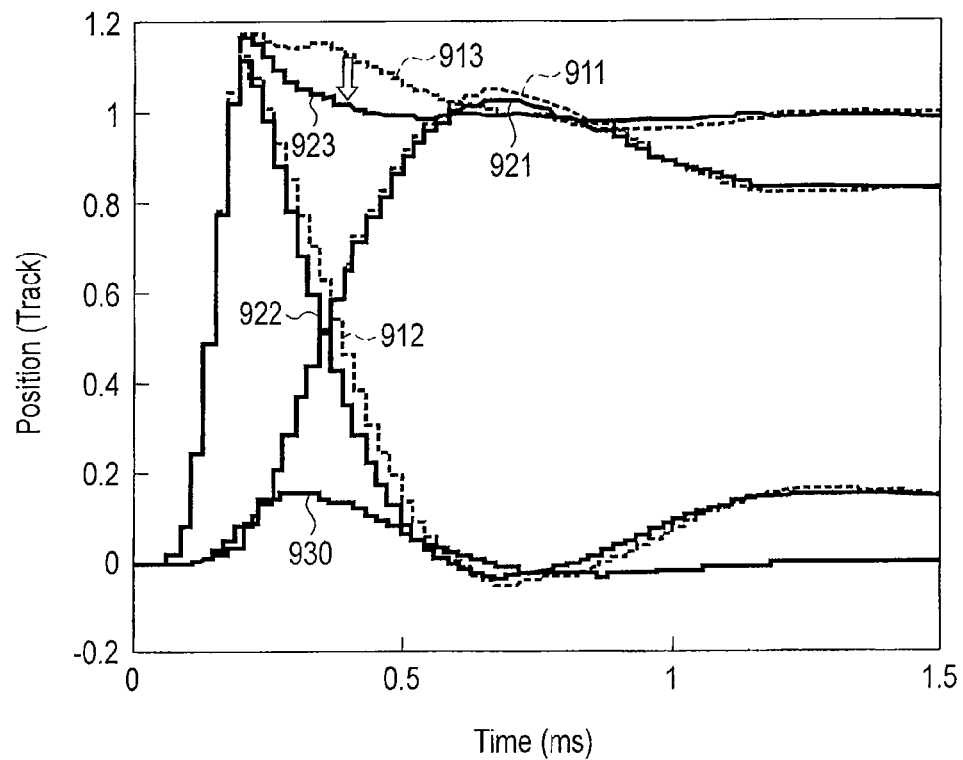

FIG. 11 shows the characteristics observed when the one-track seek operation is performed with the switch 228 in the on state, in comparison with the characteristics observed when the one-track seek operation is performed with the switch 228 in the off state. That is, FIG. 11 shows the characteristics of the one-track seek operation observed when the impact of hysteresis of the MA 15 is compensated for, in comparison with the characteristics of the one-track seek operation observed when the impact of hysteresis of the MA 15 is not compensated for as in the case of the conventional art. In FIG. 11, curves 911, 912, and 913 indicate the position of the VCMA 14, the position of the MA 15, and the position of the head 12, respectively, with respect to the time with the impact of the hysteresis not compensated for. Furthermore, curves 921, 922, and 923 indicate the position of the VCMA 14, the position of the MA 15, and the position of the head 12, respectively, with respect to the time with the impact of the hysteresis compensated for. Additionally, a curve 930 indicates the speed of the VCMA 14 with respect to the time. In FIG. 11, as in the case of FIG. 3, the position 0 corresponds to the position of track T at which the head 12 is positioned before the beginning of the one-track seek operation. The position 1 corresponds to the position of the target track T+1. In FIG. 11, a scale indicating the speed of the VCMA 14 is omitted.

As is apparent from FIG. 11, particularly from the curves 913 and 923, according to the first embodiment, the head 12 is moved to the target track at high speed and stably positioned at the target track with a minimized positioning error. In the above-described first embodiment, in the one-track seek operation, the switch 228 is turned on, and the output from the filter 226 is added to the input to the MA controller 222. That is, in the one-track seek operation, the impact of the hysteresis is compensated for. However, if the travel distance (seek distance) of the head 12 falls within the range in which the MA 15 can be driven, the first embodiment can be applied to a seek operation with a seek distance longer than one track. Furthermore, in FIG. 2, the filter 226 and the switch 228 may be replaced with each other in position. That is, the switch 228 may be arranged on an input side of the filter 226.

Second Embodiment

Now, a servo controller in a magnetic disk drive according to a second embodiment will be described. It is assumed that the configuration shown in FIG. 1 and including the servo controller 22 is applied to the magnetic disk drive according to the second embodiment as is the case with the first embodiment. The second embodiment is different from the first embodiment in the configuration of the servo controller 22.

Figure 12:
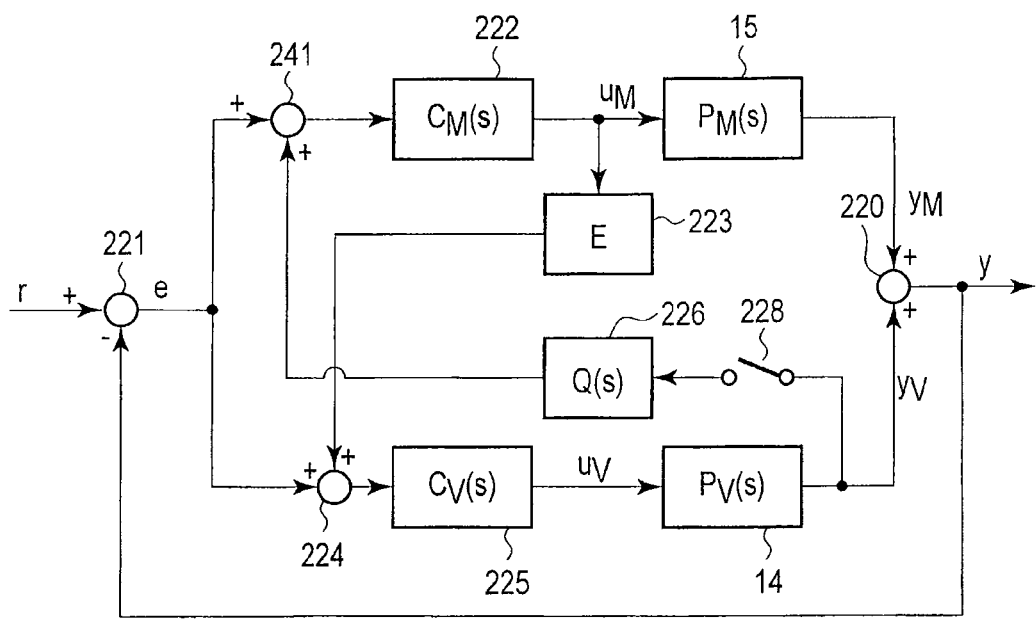
FIG. 12 is a block diagram showing an exemplary configuration of a servo controller applied in a second embodiment.

FIG. 12 is a block diagram showing a configuration of the servo controller 22 applied in the second embodiment. Elements in FIG. 12 which are equivalent to those in FIG. 2 are denoted by the same reference numbers. The servo controller shown in FIG. 12 is characterized in that an adder 241 corresponding to the adder 227 (see FIG. 2) is provided on an input side of the MA controller ($C_M(s)$) 222. Furthermore, the positions of the filter 226 and the switch 228 are opposite to those in FIG. 2. However, the positions of the filter 226 and the switch 228 may be the same as those in FIG. 2. In the second embodiment, the filter (Q(s)) 226 estimates the displacement of the MA 15 corresponding to the delay caused by the hysteresis. The estimated displacement is added by the adder 241 to the positioning error e input to the MA controller ($C_M(s)$) 222.

Third Embodiment

Now, a servo controller in a magnetic disk drive according to a third embodiment will be described. It is assumed that the configuration shown in FIG. 1 and including the servo controller 22 is applied to the magnetic disk drive according to the third embodiment as is the case with the first embodiment. The third embodiment is different from the first embodiment in the configuration of the servo controller 22.

FIG. 13 is a block diagram showing a configuration of the servo controller 22 applied in the third embodiment. Elements in FIG. 13 which are equivalent to those in FIG. 2 are denoted by the same reference numbers. The servo controller 22 shown in FIG. 13 is characterized in that well-known feed forward (FF) control is applied to the control of the VCMA 14 and the MA 15. The servo controller 22 shown in FIG. 13 comprises, in addition to the components shown in FIG. 2, a VCMA feed forward controller ($C_{FV}(s)$) 251, an adder 252, a subtractor 253, an MA feed forward controller ($C_{FM}(s)$) 254, an MA feed forward controller ($-C_{FM}(s)$) 255, and an adder 256.

In FIG. 13, target trajectories $r_V$ and $r_M$ are used for the VCMA 14 and the MA 15 are used. The target trajectories $r_V$ and $r_M$ are set in association with the distance by which the head 12 is moved to the target track (seek distance). Unlike in the case of the first embodiment, the subtractor 221 calculates the difference between the head position y and the target trajectory (second target trajectory) $r_V$. The output from the subtractor 221 is provided to the adder 224 as is the case with the first embodiment.

The VCM feed forward controller ($C_{FV}(s)$) 251 generates a feed forward control input corresponding to the target trajectory $r_V$. The adder 252 adds the feed forward control input corresponding to the target trajectory $r_V$ to a control input (feedback control input) generated by the VCMA controller 225. The addition result from the adder 252 is provided to the VCMA 14 as the control input $u_V$. The subtractor 253 calculates the difference between the head position y and the target trajectory (first target trajectory) $r_M$. The output from the subtractor 253 is provided to the MA controller ($C_M(s)$) 222.

The MA feed forward controller ($C_{FM}(s)$) 254 generates a feed forward control input corresponding to the target trajectory $r_M$. The MA feed forward controller ($-C_{FM}(s)$) 255 generates a feed forward control input corresponding to the motion of the VCMA 14 equivalent to the target trajectory $r_V$. The adder 256 adds each of the feed forward control inputs generated by the MA feed forward controllers 254 and 255 to the control input (feedback control input) generated by the MA controller ($C_M(s)$) 222. Unlike in the case of the first embodiment, the MA model 223 estimates the displacement of the MA 15 based on the addition result from the adder 256.

In the third embodiment, unlike in the case of the first embodiment, the addition result from the adder 256 is provided to the adder 227. As in the case of the first embodiment, the adder 227 is also provided with the control input corresponding to the future displacement of the MA 15 or the future MA voltage estimated by the filter ($Q(s)$) 226. As in the case of the first embodiment, the addition result from the adder 227 is provided to the MA 15 as the control input $u_M$.

Fourth Embodiment

Now, a servo controller in a magnetic disk drive according to a fourth embodiment will be described. It is assumed that the configuration shown in FIG. 1 and including the servo controller 22 is applied to the magnetic disk drive according to the fourth embodiment as is the case with the first embodiment. The fourth embodiment is different from the first embodiment in the configuration of the servo controller 22.

FIG. 14 is a block diagram showing a configuration of the servo controller 22 applied in the fourth embodiment. Elements in FIG. 14 which are equivalent to those in FIG. 12 and FIG. 13 are denoted by the same reference numbers. The servo controller shown in FIG. 14 is characterized in that an adder 241 corresponding to the adder 227 (see FIG. 2) is provided on the input side of the MA controller ($C_M(s)$) 222. In the fourth embodiment, the filter ($Q(s)$) 226 estimates the displacement of the MA 15 corresponding to the delay caused by the hysteresis. The estimated displacement is added by the adder 241 to an output from the subtractor 253 input to the MA controller ($C_M(s)$) 222.

At least one of the above-described embodiments can provide a magnetic disk drive comprising a microactuator that enables implementation of a seek operation compatible with the hysteresis property of the microactuator.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
   a voice coil motor (VCM) actuator configured to coarsely move a head;
   a microactuator configured to slightly move the head; and
   a servo controller configured to control a predetermined seek operation of moving the head to a target track using both the VCM actuator and the microactuator,
   wherein the servo controller comprises:
      a microactuator controller configured to control the microactuator based on a positioning error between the target track and a position of the head or a positioning error between a first target trajectory and the position of the head, wherein the first target trajectory corresponds to the microactuator;
      a microactuator estimator configured to estimate a first displacement of the microactuator using a linear model from a first control input to be provided to the microactuator;
      a VCM actuator controller configured to control the VCM actuator based on a positioning error between the target track and a position of the VCM actuator or a positioning error between a second target trajectory and the first position of the VCM actuator, wherein the second target trajectory corresponds to the VCM actuator and the first position is estimated from the position of the head and the first displacement;
      a filter configured to estimate a position of the VCM actuator corresponding to a delay in the displacement of the microactuator caused by hysteresis of the microactuator, from a state of the VCM actuator in the predetermined seek operation, and to estimate a second displacement that is the delayed displacement of the microactuator, from the estimated position; and an adder configured to add the second displacement or a second control input corresponding to the second displacement to an input to the microactuator controller or an input to the microactuator.

2. The magnetic disk drive of claim 1, further comprising a switch configured to be set to a first state at beginning of the predetermined seek operation and to permit an effective output to be transmitted from the filter to the adder during a period when the switch is set in the first state.

3. The magnetic disk drive of claim 2, further comprising a switching controller configured to switch the switch to a second state in which an effective output is restrained from being transmitted from the filter to the adder.

4. The magnetic disk drive of claim 3, wherein a distance required to move the head to the target track during the predetermined seek operation falls within a range in which the microactuator is driven.

5. The magnetic disk drive of claim 1, wherein the state of the VCM actuator is a speed of the VCM actuator; and the filter estimates a future position of the VCM actuator by multiplying the speed of the VCM actuator by a predetermined coefficient.

6. The magnetic disk drive of claim 5, further comprising a state observer configured to estimate the state of the VCM actuator including the speed of the VCM actuator based on an output from the VCM actuator controller, the first displacement, the position of the head, and a VCM actuator model.

7. The magnetic disk drive of claim 1, wherein:

the state of the VCM actuator is a position of the VCM actuator; and the filter comprises:

a differentiator configured to differentiate the position of the VCM actuator in order to convert the position of the VCM actuator into the speed of the VCM actuator; and a multiplier configured to calculate the estimated position of the VCM actuator by multiplying the speed of the VCM actuator by a predetermined coefficient.

8. The magnetic disk drive of claim 7, further comprising a state observer configured to estimate the state of the VCM actuator including the position of the VCM actuator based on an output from the VCM actuator controller, the first displacement, the position of the head, and a VCM actuator model.

9. The magnetic disk drive of claim 1, wherein the servo controller is configured to form a decoupling structure for the VCM actuator and the microactuator.

10. The magnetic disk drive of claim 1, wherein the servo controller is configured to control the microactuator in accordance with the first target trajectory and motion of the VCM actuator and to control the VCM actuator in accordance with second target trajectory.

* * * * *